S. M. Palmer. Circular Gang Saw Mill.

No. 116625 — Patented Jul 4 1871

Witnesses:
Gustave Dieterich
Wm. H. C. Smith

Inventor:
S. M. Palmer
per Munn & Co.
Attorneys.

UNITED STATES PATENT OFFICE.

SAMUEL M. PALMER, OF GLEN'S FALLS, NEW YORK.

IMPROVEMENT IN CIRCULAR-SAW MILLS.

Specification forming part of Letters Patent No. 116,625, dated July 4, 1871.

*To all whom it may concern:*

Be it known that I, SAMUEL M. PALMER, of Glen's Falls, in the county of Warren and State of New York, have invented a new and useful Improvement in Circular Gang-Saw Mills; and I do hereby declare that the following is a full, clear, and exact description thereof, which will enable others skilled in the art to make and use the same, reference being had to the accompanying drawing forming part of this specification, in which—

Figure 1:
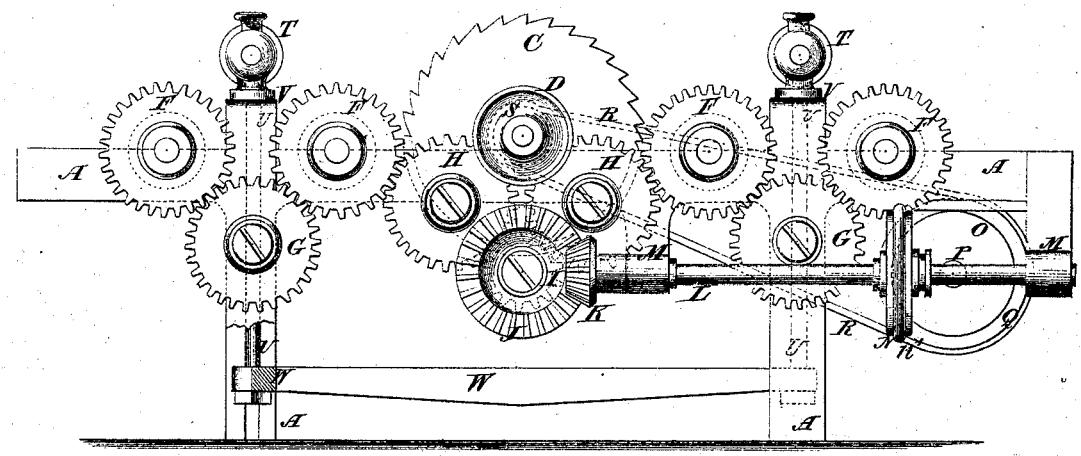
Figure 2:
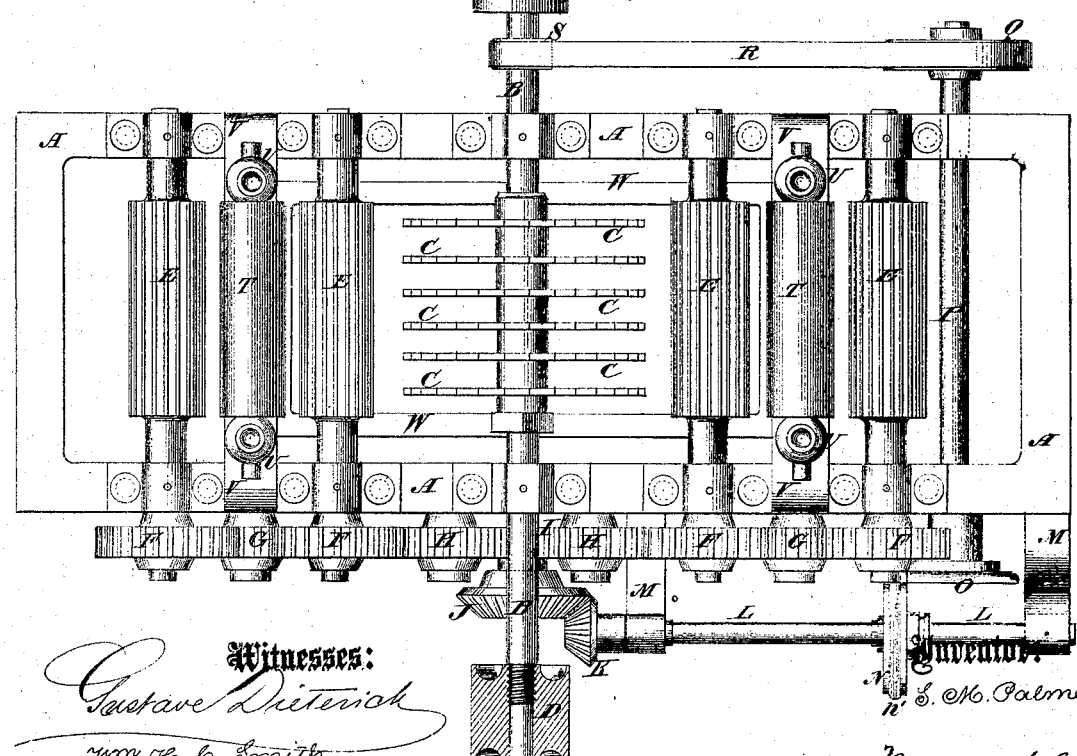

Figure 1 is a side view of my improved machine. Fig. 2 is a top view of the same, part of one of the driving-pulleys being broken away to show the construction.

Similar letters of reference indicate corresponding parts.

My invention has for its object to improve the construction of circular gang-saw mills so as to make them more convenient in use, more effective in operation, more easily manipulated, and more readily adjusted to feed faster or slower; and it consists in the construction and combination of various parts of the machine, as hereinafter more fully described.

A is the frame-work of the machine. B is the mandrel, to which the gang of circular saws C are detachably attached in the ordinary manner, and which revolves in bearings attached to the frame A. To each end of the mandrel B is attached a pulley, D, one or both of which is detachably attached to the said mandrel by means of a screw-thread cut upon the said mandrel, and upon the inner surface of the said pulley, as shown in Fig. 2, or in any other convenient manner, so that the said pulley or pulleys can be readily removed when required to enable the saws C to be detached from said mandrel. By this arrangement the saws are driven by power applied to both ends of the mandrel instead of by power applied to only one end, as is the usual construction. E are the lower feed-rollers, which I prefer to make grooved, and the journals of which revolve in bearings attached to the frame A. To the projecting ends of the journals of the feed-rollers E are attached gear-wheels F. The teeth of the two gear-wheels F, upon each side of the saws C, mesh into the teeth of a gear-wheel, G, which runs loosely upon a gudgeon attached to the frame A, and is placed below and midway between said two gear-wheels, F. The teeth of the inner gear-wheel of each pair F mesh into the teeth of a gear-wheel, H, which revolves loosely upon a gudgeon attached to the frame A. The teeth of the two gear-wheels H mesh into the teeth of the same gear-wheel I, which works loosely upon a gudgeon attached to the frame A. Upon the gear-wheel I is formed, or with it is rigidly connected, a bevel-gear wheel, J, into the teeth of which mesh the teeth of the bevel-gear wheel K attached to the inner end of the shaft L, which revolves in bearings in arms or brackets M attached to the frame A. Upon the shaft L, near its outer end, is placed a friction-wheel, N, which is connected with said shaft L by a tongue and groove or by other well-known means, so that it may carry the said shaft with it in its revolution, and at the same time may slide freely upon it. The end of the hub of the friction-wheel N is grooved to receive the lever, by which it is moved back and forth along the shaft L, said lever not being shown in the drawing. The face of the friction-wheel N may be made plain or grooved, and may have a rubber band, n', placed upon it, if desired. The face of the friction-wheel N rests against the smooth side of the disk O, and is revolved by the revolution of said disk. By moving the friction-wheel N toward or from the axis of the disk O the feed may be slowed or quickened, as may be desired, or as the character of the work may require. The friction-disk O is attached to the end of the shaft P, which revolves in bearings attached to the frame A, and to the other end of which is attached a pulley, Q. Around the pulley Q passes a belt, R, which also passes around the pulley S attached to the mandrel B. By this construction, should the feed-rollers encounter any obstruction, the friction-disk O will slide upon the friction-wheel N until the machine can be stopped, thus guarding against breakage of the feed mechanism. T are the upper feed-rollers, the journals of which revolve in bearings in the upper ends of the uprights U, which pass through and move up and down in holes in the arms or brackets V attached to or formed upon the frame A. The lower ends of the four uprights U are securely attached to the four corners of the rigid frame W, which is made sufficiently heavy to hold the upper feed-rollers T down upon the timber with the necessary force. The frame W is raised to raise the upper feed-rollers T away from the timber, when required, by a double incline pushed beneath it by a lever, or by any other convenient means.

Having thus described my invention, what I claim as new, and desire to secure by Letters Patent, is—

A gang-saw shaft, having a pulley, D, at each end, and the feed-rolls E T located as described, combined with the mechanism herein shown and described for operating the same, all constructed and arranged as and for the purpose specified.

The above specification of my invention signed by me this 1st day of April, 1871.

SAMUEL M. PALMER.

Witnesses:
   JAMES T. GRAHAM,
   T. B. MOSHER.